United States Patent
Giacomini

(12) 
(10) Patent No.: US 6,296,229 B1
(45) Date of Patent: Oct. 2, 2001

(54) METAL BALL VALVES FOR GAS

(75) Inventor: Mario Giacomini, S. Maurizio d'Opaglio (IT)

(73) Assignee: Giacomini S.p.A. (IT)

( * ) Notice: Subject to any disclaimer, the term of this patent is extended or adjusted under 35 U.S.C. 154(b) by 0 days.

(21) Appl. No.: 09/552,963

(22) Filed: Apr. 20, 2000

(30) Foreign Application Priority Data

Apr. 26, 1999 (IT) ............................................. CO99A0016

(51) Int. Cl.[7] ....................................................... F16K 5/06
(52) U.S. Cl. ................. 251/314; 251/315.01; 251/315.1; 251/286
(58) Field of Search ........................... 251/315.01, 315.1, 251/315.15, 315.13, 315.12, 315.16, 286, 287, 314, 316, 359

(56) References Cited

U.S. PATENT DOCUMENTS 4,714,236   12/1987   Filiberti .
5,332,193 * 7/1994   Giacomini ....................... 251/315.16
5,560,392   10/1996  Spang et al. .
5,590,680 * 1/1997   Gugala et al. ............... 251/315.01 X

FOREIGN PATENT DOCUMENTS 0 297 382 A2   1/1989   (EP) .

* cited by examiner

Primary Examiner—Kevin Lee
(74) Attorney, Agent, or Firm—Kirschstein, et al.

(57) ABSTRACT

An improved metal ball valve for gas comprises a shutter housing chamber in which are provided two opposite sides or flats allowing to define annular recesses in which shutter sealing gaskets are substantially integrally engaged. The shutter weight is advantageously reduced by providing, for example, a bottom flattened portion and an axial hole, the shutter forming moreover, with the valve rod element, preferably a single-piece assembly, the rod-shutter assembly being held in the body of the valve by upsetting thereon the thinned end crown of a collar of the valve body.

12 Claims, 5 Drawing Sheets

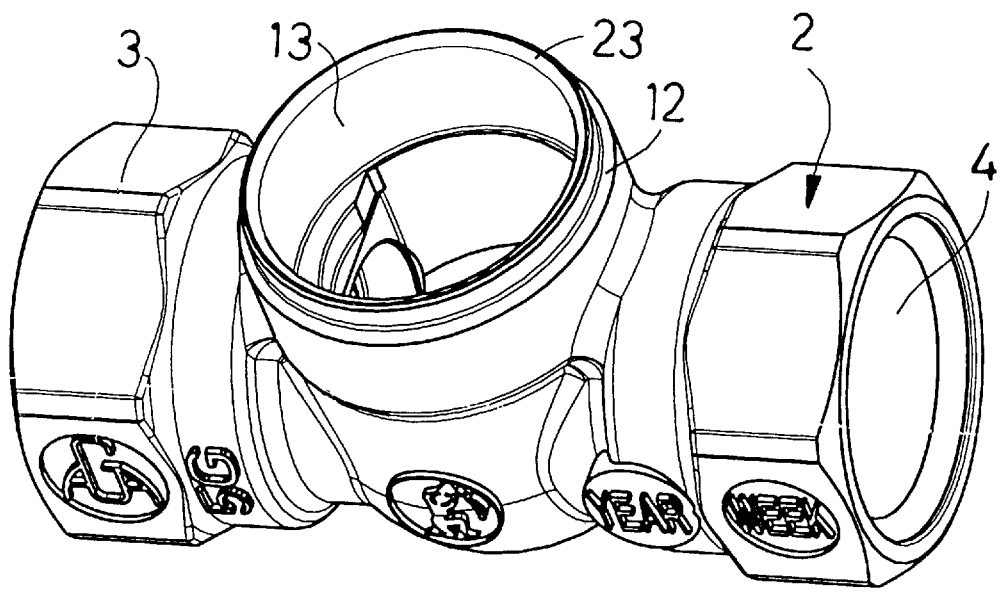
FIG. 5
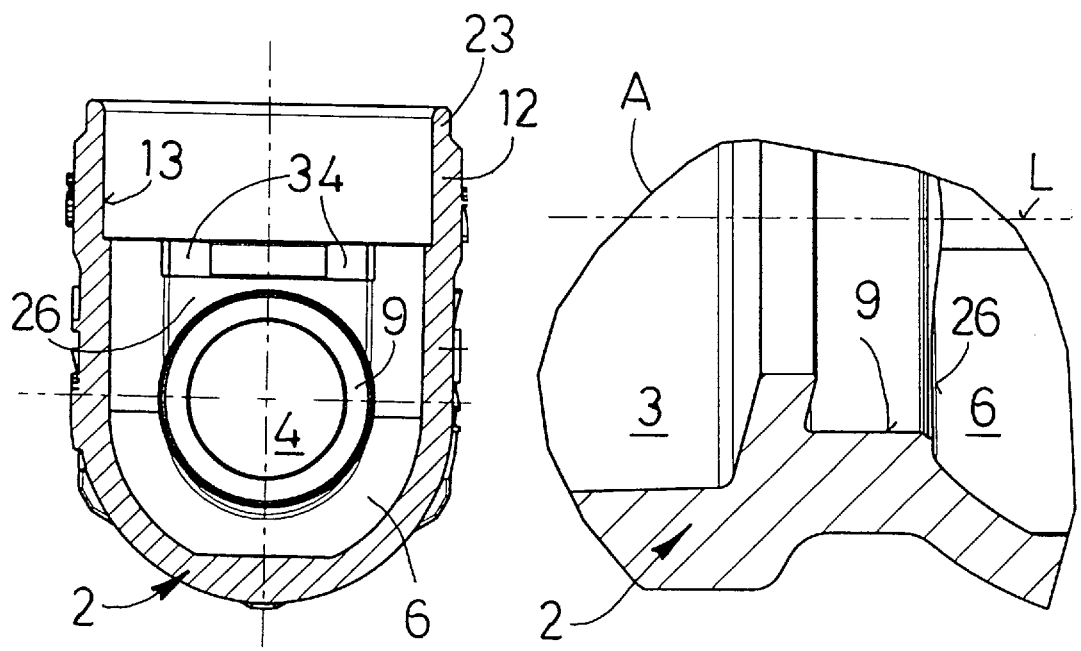
FIG. 6
FIG. 7

METAL BALL VALVES FOR GAS

FIELD OF THE INVENTION

The present invention relates to a metal improved ball valve, specifically designed for gas application.

The invention relates moreover to an improved pressing method for pressing the metal valve body, e.g. a hot-pressing method for a brass valve body.

BACKGROUND OF THE INVENTION

While the improved valves according to the present invention have been specifically designed for gas systems, in which they must meet preset stringent requirements, such as a high resistance against outer high temperatures, i.e. in fire conditions, they can also be used for any liquid fluids.

The inventor believes that of the above prior valves, the valve disclosed in the Italian Utility Model No. 209,019, corresponding to the U.S. Pat. No. 4,714,236, represents the most pertinent status of the art.

While ball valves for liquids can be made from metals or plastic materials, ball valves for gases can be exclusively made from metal materials, since a plastic material cannot resist against, for example, the high outer temperatures of a fire event.

Even if the ball shutter and screw elements of plastic material ball valves are conventionally made as a plastic material single piece, to which the control member, such as a knob, can be fixedly coupled, it should be apparent that the above mentioned single-piece ball shutter-rod unit, as well as the valve body, and the related molding and assembling processes, cannot be merely adopted when using a metal, such as brass instead of a plastic material.

Thus, in the following disclosure exclusively metal valves will be considered.

Since the gas valves must meet technical requirements set by very stringent regulations, it would be moreover apparent that these valves must operate in a very reliable manner. On the other hand, it has been found that prior valves could be further improved both operatively and construction-wise.

With reference to FIG. 1, showing the prior art disclosed in the U.S. Pat. No. 4,714,236, a valve 1 comprises a valve body 2, arranged between an inlet fitting 3 and an outlet fitting 4, and a chamber 6 for engaging therein a ball shutter 7, supported between two opposite sealing gaskets 8, which are individually housed in a respective annular recess 9.

As the bottom portion of the valve 6, having a circular shape in a middle horizontal plane thereof, has a substantially spherical configuration, the gaskets 8, on their side facing the chamber 6 inside, circumferentially project cantilever-wise, in a different degree, from their seats. Thus, the compression on the gaskets by the conveyed fluid, i.e. that fluid which is present in the valve, would not be evenly distributed in the circumferential direction and, in a high pressure condition, said gaskets would be deformed with a consequent resistance against a rotary movement of the ball.

Moreover, for lightening the ball shutter, and reduce the shutter material cost, the inside of the shutter 7 is hollowed by turning operations. Thus, this weight reducing process would require a comparatively long operation time and, while allowing to recover the high value metal, would increase the making cost.

With reference again to FIG. 1, the valve control rod or screw is indicated by 11 and is engaged in a seat 13 of the collar 12 of the valve body 2, the screw being clamped by a friction ring or washer 14 and a resilient ring 16, engaged in a contoured slot 17 of the collar 12. The reference numbers 18 and 19 respectively indicating a sealing O-ring and a supporting and flame-breaking gasket, housed in corresponding grooves of the rod 11.

Prior valves are moreover affected by the following drawbacks:

the provision of a comparatively large number of components, such a eleven components for the valve of the U.S. Pat. No. 4,714,236;

the provision of a ball shutter and rod which are removably coupled to one another, thereby requiring two machine tools for making them from a bar material with a consequent increase of the making and assembling cost;

the reduction of the ball weight can be obtained only by a complex and long inner spherical turning of the shutter;

the abutments for limiting the 90° rotary movement of the shutter are formed as lugs on the valve body and co-operate with counter-abutments provided on the control member, for example a knob, thereby if said knobs is loosen or illicitly removed, then the shutter could not be arranged off or on position;

the contoured seat provided in the rod element housing collar increases the machining time and, consequently, the making cost;

the rod coupling means require two discrete components, i.e. a suitably sized locating washer and a clamping resilient ring element.

SUMMARY OF THE INVENTION

Accordingly, the main object of the present invention is to provide an improved metal ball valve, in particular for gas applications, including shutter sealing gaskets which can be evenly circumferentially stressed, and a shutter which can be greatly lightened by a simple and short time machining, and including a small number of components.

Another object of the present invention is to overcome further drawbacks of the prior art, to allow an overall reduction of the making time and cost, while preventing the shutter from being illicitly removed, upon removing the clamping knob.

According to one aspect of the present invention, the above mentioned objects are achieved by an improved gas ball valve.

The invention advantageously provides a single-piece metal screw-shutter assembly, for example of a brass material, which can be made by a single machine tool and in a comparatively short processing time, starting from a bar material or a pressing or die-casting half-finished material.

The invention allows to substantially reduce the weight of the ball shutter, the axial drilling operations being advantageously extended up to the rod portion.

The invention allows to arrange the 90° rotary movement limiting abutments for the shutter in a region between the rod portion and shutter portion, on one side and, on the other side, in the valve body, thereby the rod-shutter assembly can be quickly and accurately driven to a shut-off or open position, or to any middle positions, even if the knob is removed or illicitly detach.

The invention allows to simplify the machining of the seat or recess of the collar housing therein the rod portion, said seat being made as a cylindrical seat.

The invention allows to omit two components for clamping the rod-shutter assembly in the valve body, whereby it is advantageously possible to fixedly clamp the rod-shutter assembly even after having removed the knob or the like.

The hot-pressing process for pressing the valve body provides shutter sealing gasket housing seats in which the gaskets are substantially integrally engaged, or with a small even circumferential projection of said gaskets projecting toward the shutter, without requiring additional machining operations or a long machining time.

The improved metal ball valve, in particular for gas applications, according to the invention, provides a lot of important advantages.

At first, it is possible to smoothly and evenly turn the shutter even under a high pressure condition, since the shutter is evenly supported and clamped on its sealing gaskets through the overall circumferential extensions of said gaskets. The lightening of the shutter, or of the single-piece rod-shutter assembly is comparatively high, and is moreover obtained in a short time and by a single machining operation on a single automatic machine tool.

The provision of the rod and shutter as a single piece, which can be machined from a bar material, contributes to reduce the component number and the machining and assembling time with a consequent reduction of the overall making cost. In particular, this cost would be further reduced since two components (locating anti-friction washer and resilient ring) are omitted, and since the contoured seat for housing said components in the valve body collar is also omitted.

Moreover, the provision of a cylindrical seat in the valve body collar for housing therein the rod portion is such as to reduce the machining time and related cost.

The provision, as a means for clamping the rod element in the valve body, of a collar upset free end allows the shutter to be safely turned to a shut-off position, a full or partial opened condition, upon removing or disengaging the control knob. This upsetting does not require any additional clamping portions and can be performed in a simple and quick manner by conventional machines. This proper locating of the shutter in its closing position, or in its full or partial opening position, can be also achieved owing to the provision of the rotary movement limiting abutments arranged inside the valve, after assembling the latter.

Yet a further advantage is provided by the hot-pressing of the valve body, since it is possible to directly provide in this hot-pressing process the opposite flattened portions, parallel to one another and perpendicular to the valve longitudinal axis, thereby the seats for substantially integrally housing therein the shutter sealing gaskets can be made practically without any additional machining operations, differently from prior valves. By this a hot-pressing process, and a fine finishing of the inner surface, any additional machining operations for removing the bottom portion of the shutter housing chamber can be omitted, thereby also reducing the overall making time.

BRIEF DESCRIPTION OF THE DRAWINGS

Further characteristics, advantages and details of the improved metal ball valve according to the present invention will become more apparent from the following description of an exemplary embodiment of a ball valve, in particular for gas application, according to the invention, with reference to the accompanying drawings, where:

FIG. 5 is a top slanted perspective view of the valve body according to the invention;

FIG. 6 is a cross-sectional view taken along the line VI—VI of FIG. 3;

FIG. 7 illustrates on an enlarged scale, the detail A of FIG. 3;

DESCRIPTION OF THE PREFERRED EMBODIMENT

Figure 1:
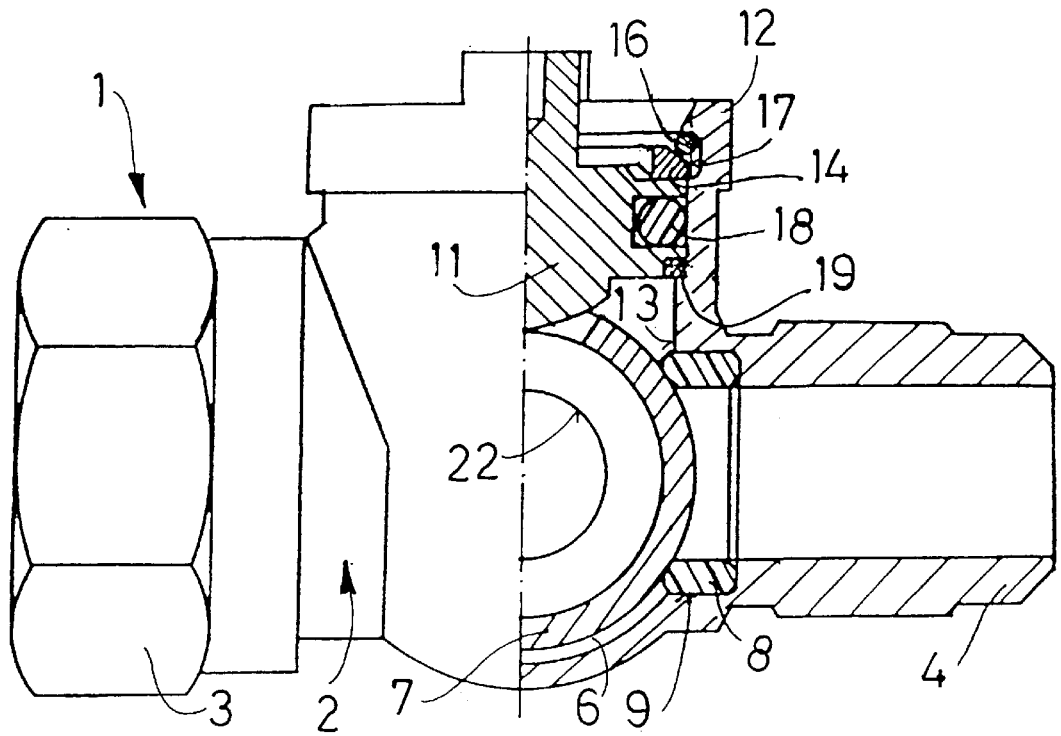
FIG. 1 is a half view and a half longitudinal middle cross section illustrating a prior valve.
Figure 2:
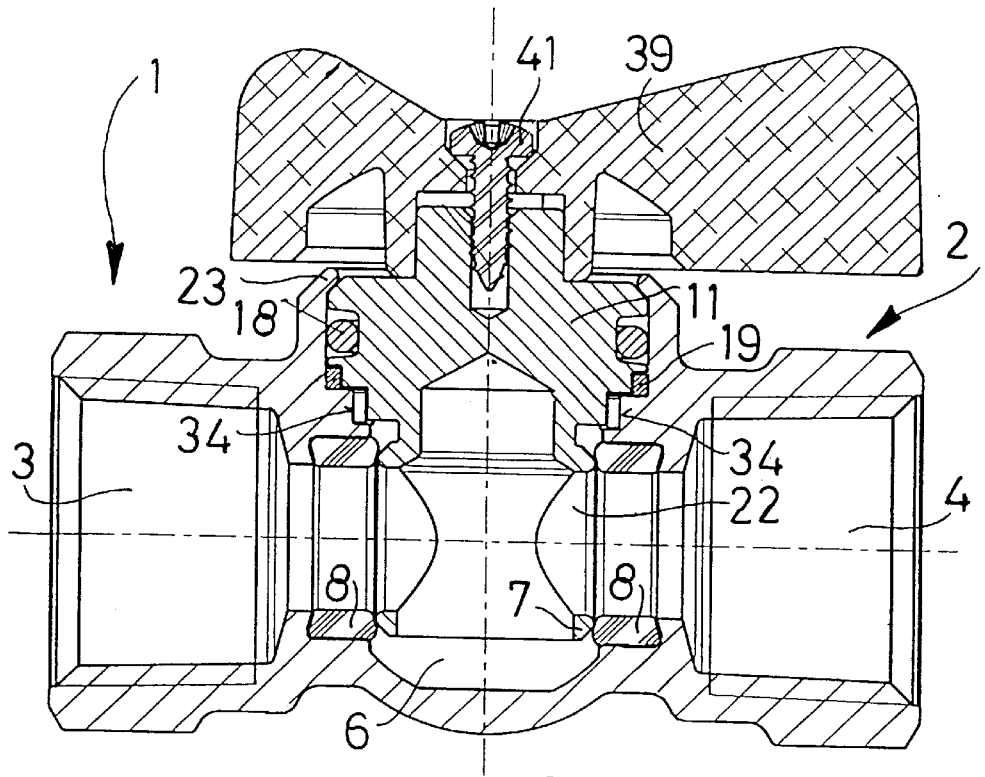
FIG. 2 is a middle longitudinal cross section through the improved ball valve according to the invention.
Figure 3:
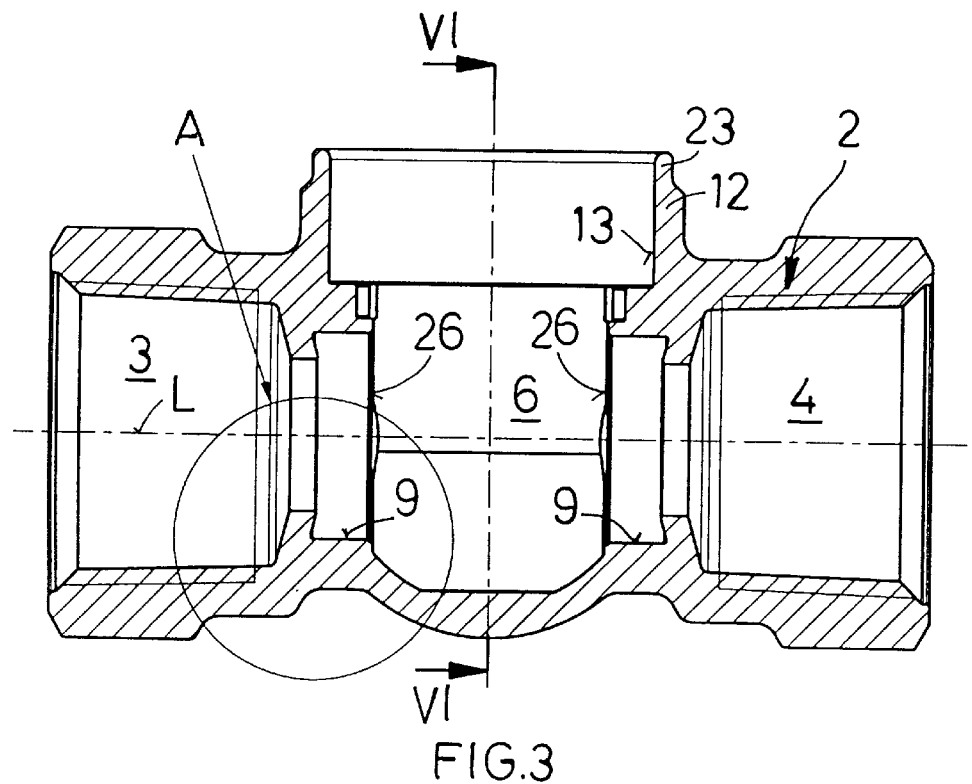
FIG. 3 is a further middle longitudinal cross section through the valve body, according to line III—III of FIG. 4, the single-piece rod-shutter assembly being omitted.
Figure 4:
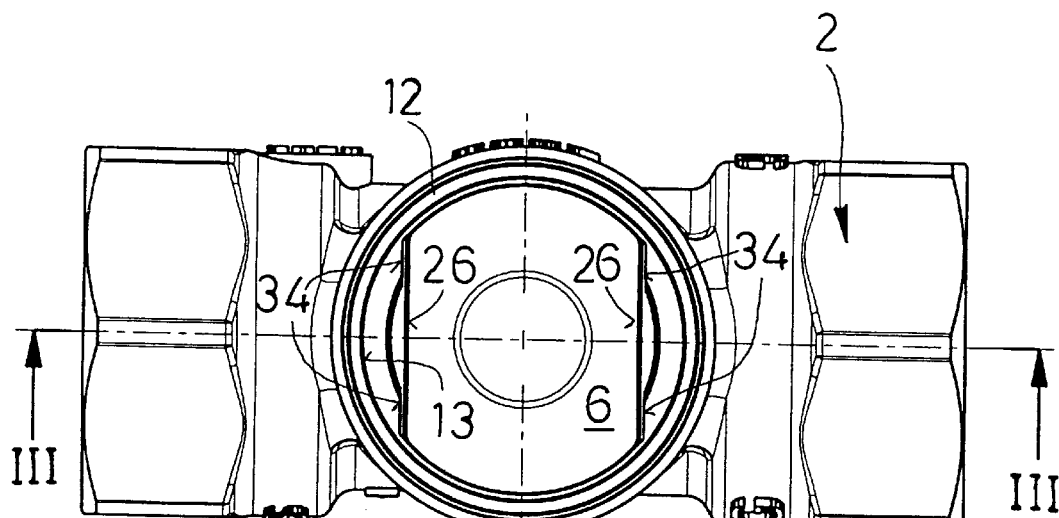
FIG. 4 is a top plan view showing the body of the valve of FIG. 3.
Figure 8:
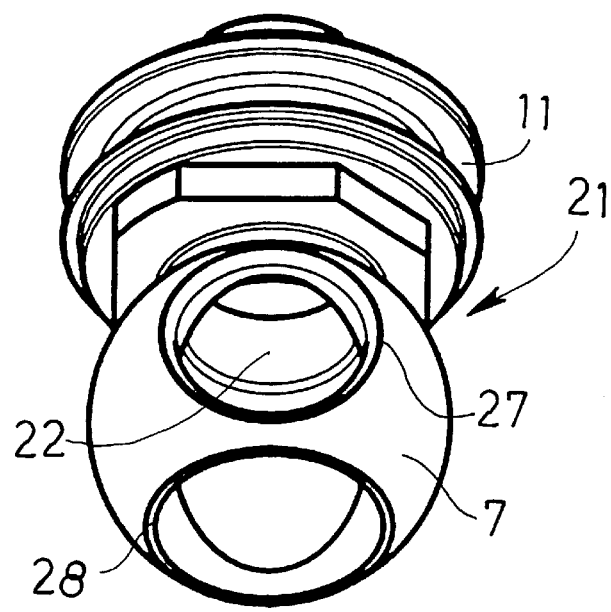
FIG. 8 is a bottom perspective view showing the rod-ball shutter assembly according to the present invention.
Figures 9, 10:
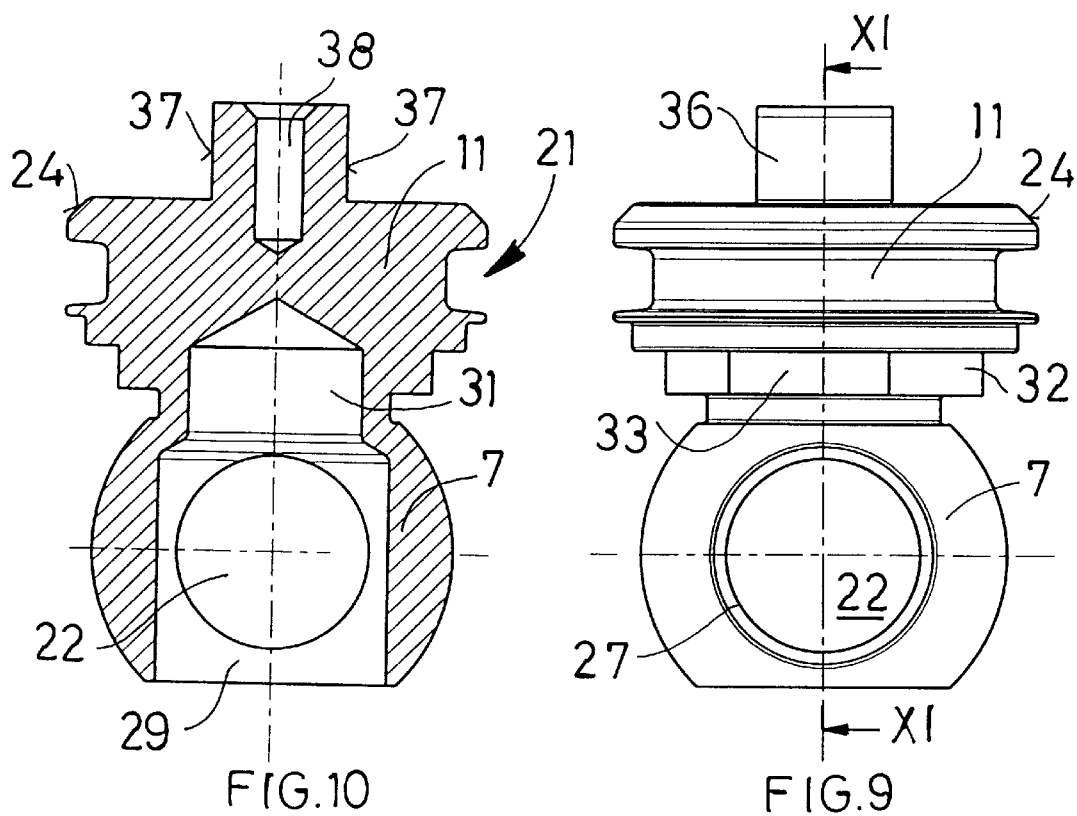
FIG. 9 is a front view of the rod-shutter assembly of FIG. 8.
FIG. 10 is a cross-sectional view X—X of FIG. 12.
Figures 11, 12:
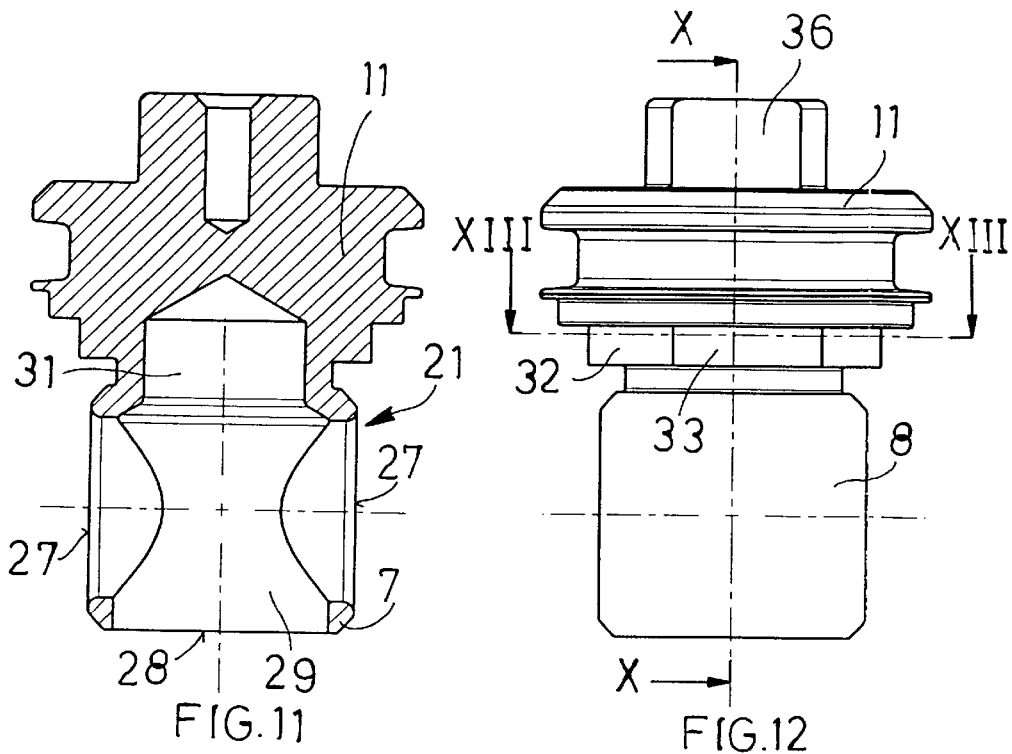
FIG. 11 is a cross-sectional view XI—XI of FIG. 9.
FIG. 12 is a front view of the rod-ball shutter assembly according to the invention, turned through 90° with respect to FIGS. 9 and 10.
Figure 13:
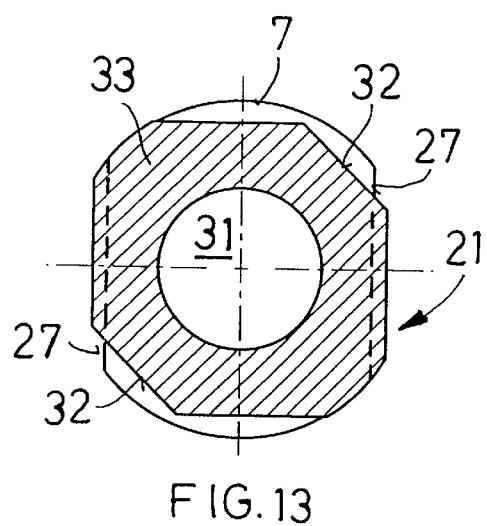
FIG. 13 is a further cross-sectional view through the middle region between the rod and ball shutter portions according to the invention and, more specifically, taken along the section line XIII—XIII of FIG. 2.

In FIGS. 2 to 13, showing the improved valve according to the present invention, elements corresponding to like elements of FIG. 1 have been indicated by the same references.

Likewise prior valves, the metal valve 1, for example made of a brass material, according to the present invention, comprises a hot-pressed valve body 2, preferably in a single piece, and including an inlet duct 3, an outlet duct 4 and a chamber 6 for housing therein a ball shutter 7, which can be turned by a screw or rod portion 11.

According to the invention, the ball shutter 7 and rod 11 are preferably made as a unit assembly 21 including a single piece rod-shutter preferably made from a metal bar material, such a brass material, or a hot molded semifinished material, in the case of brass, or from a die-cast material, the ball shutter 7 being provided with a through duct 22.

According to the invention, the seat or recess 13 formed in the collar 12 has a cylindrical configuration. Further according to the invention, the valve 1 is provided with clamping means for clamping the screw portion 11 in said seat 13, said clamping means being made as a thinned and crown element 23 which, upon introducing the rod-shutter assembly 21 into the valve body 2, is upset on the screw portion 11. To that end, the outer top corner of the rod portion 11 is beveled at 24, FIG. 9, thereby providing a proper locating and an even and smooth movement of the rod-shutter assembly 21.

According to the invention, the middle horizontal cross section of the shutter portion 11 housing chamber 6 is not circular, as in prior art valves, but, at the inlet 3 and outlet 4 duct ports, is provided with two flat or flattened opposite surfaces 26, parallel to one another and perpendicular to the longitudinal axis L of the valve body 2. The flattened surfaces or portions 26 are made, according to the invention, during the hot-pressing of the valve body 2, simultaneously with the pressing step, by a suitable punch element. Thus, the gasket 8 housing seats 9 will end toward the chamber 6 on a flat surface and will have an even depth, thereby the shutter element 7 sealing gaskets 8 will be practically substantially integrally and evenly housed in the seats 9 and will project only for a small portion, and, more specifically, in an accurate even manner through the overall circumferential contour thereof.

The shutter portion 7 is provided, in a per se known manner, with two flattened portions 27, formed by the outlets of the thoroughgoing ducts 22. For desirably lightening the shutter portion 7, according to the invention, a further flattened portion 28 is provided on the bottom portion of the shutter 7, together with an axial hole 29 passing perpendicularly through the through hole 22 and preferably having a smaller diameter end portion 31 thereof penetrating the rod 11.

According to the invention, the abutment means and counter-means for delimiting the 90° rotary movement of the rod-shutter assembly 21 are provided, upon assembling the valve 1, inside the valve 1 and, more specifically, respectively on the rod element-shutter unit 21 and on the valve body 2. As shown in particular in FIGS. 8, 9, 12 and 13, the abutment means on the rod-shutter 21 assembly comprise two slanted strip segments 32, provided in a coplanar and middle portion 33 of the rod-shutter assembly 21 between the rod 11 and shutter 7, said abutment limiting the 90° turning movement of the rod-shutter assembly 21, respectively in a turning direction or in the other.

The counter-abutment means 34 in the valve body 2 comprise rectilinear segments 34 which are slightly outwardly offset from the flattened portions 26 and being parallel to the latter.

Finally, it should be moreover apparent that the rod 11 is provided, at the top thereof, with a contoured end-piece 36 having parallel sides 37 and an axial hole 38. In said end-piece 36 is geometrically engaged the driving element 39, for example a knob or the like. In said hole 38 a screw 41 for clamping the knob 39 to the rod-shutter 21 assembly is moreover engaged.

From the above constructional and functional disclosure, it should be apparent that both a safe and even driving of the rod-shutter assembly 21 in any operation conditions, (even under a high pressure, owing to a circumferentially even preloading on the partially circumferentially projecting gaskets, increasing the useful life thereof), and a great constructional simplification, a great component number and machining-assembling time, cost and weight reduction as well as a comparatively high value material recovery have been achieved, while preserving the advantageous features of prior valves such as the basic configuration of the rod portion housing the sealing O-ring 18 and supporting a flame breaking gasket 19 as well as the single-piece arrangement of the valve body 2.

In practicing the invention, those skilled in the art may freely use the inventive idea teachings either individually or in combination, as stated, without departing from the scope of the invention.

Moreover any modifications and variations could be brought to the invention, depending on the intended application, such as by providing a two- or multiple part valve body, or by using any other metals or alloys such as bronze, or an angled valve body, or a valve body including further components such as filters and the like, without departing from the inventive scope as illustrated and defined in the accompanying claims.

What is claimed is:

1. In a valve including
   A) a one-piece valve body extending along a longitudinal axis and having an inlet, an outlet, and a valve chamber between the inlet and the outlet,
   B) a shutter having a duct and mounted in the valve chamber for turning movement between open and closed positions in which fluid is respectively permitted to flow, and blocked from flowing, from the inlet through the duct toward the outlet, and
   C) a drive for turning the shutter,
   wherein the improvement comprises:
   a) a first generally planar surface integral with the valve body and located between the inlet and the valve chamber, a first annular valve seat opening onto the first surface, and a first annular seal in the first seat;
   b) a second generally planar surface integral with the valve body and located between the valve chamber and the outlet, a second annular valve seat opening onto the second surface, and a second annular seal in the second seat;
   c) the first and second surfaces being generally parallel to each other and lying in planes generally perpendicular to the longitudinal axis; and
   d) the first and second seals extending entirely circumferentially around the longitudinal axis and projecting to the same extent axially past the first and second surfaces, respectively, into uniform sealing engagement with opposite sides of the shutter.

2. The valve of claim 1, wherein the valve body is constituted of a hot-pressed metal material.

3. The valve of claim 1, wherein the valve body has third and fourth spherical surfaces extending between the first and second surfaces, all of said surfaces bounding the valve chamber.

4. The valve of claim 1, wherein the duct has opposite, generally flattened end regions in sealing engagement with the seals in the open position.

5. The valve of claim 1, wherein the shutter has a generally planar bottom region.

6. The valve of claim 5, wherein the shutter has a transverse bore extending through the bottom region and into the shutter in a transverse direction generally perpendicular to the longitudinal axis.

7. The valve of claim 1, wherein the valve body has an integral, hollow collar extending in a transverse direction generally perpendicular to the longitudinal axis, and wherein the shutter has an integral rod received within the collar.

8. The valve of claim 7, wherein the shutter has a transverse bore extending through the shutter and into the rod.

9. The valve of claim 7, wherein the collar has a deformable, crown region for clamping the collar onto the rod upon deformation of the collar.

10. The valve of claim 9, wherein the rod has an upper beveled surface against which the crown region bears after deformation.

11. The valve of claim 7, wherein the rod has a cylindrical shape, and wherein the collar has a cylindrical bore for receiving the rod.

12. The valve of claim 7, wherein the rod has an abutment, and wherein the valve body has a pair of counter-abutments at one of the first and second generally planar surfaces for engaging the abutment when the rod is jointly turned with the shutter by the drive.

* * * * *